(12) United States Patent
Liu

(10) Patent No.: US 11,546,018 B2
(45) Date of Patent: Jan. 3, 2023

(54) COMMUNICATION METHOD AND APPARATUS, POWER RECEIVING DEVICE, AND POWER TRANSMISSION DEVICE

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 17/261,027

(22) PCT Filed: Jul. 18, 2018

(86) PCT No.: PCT/CN2018/096179
§ 371 (c)(1),
(2) Date: Jan. 17, 2021

(87) PCT Pub. No.: WO2020/014908
PCT Pub. Date: Jan. 23, 2020

(65) Prior Publication Data
US 2021/0306035 A1 Sep. 30, 2021

(51) Int. Cl.
*H04B 5/00* (2006.01)
*H02J 50/80* (2016.01)
(Continued)

(52) U.S. Cl.
CPC .......... *H04B 5/0037* (2013.01); *H02J 50/80* (2016.02); *H04B 5/0031* (2013.01); *H04W 4/20* (2013.01); *H04W 4/80* (2018.02)

(58) Field of Classification Search
CPC .......... H04B 5/0025; H04B 5/31; H04B 5/37; H04W 4/80
See application file for complete search history.

(56) References Cited

U.S. PATENT DOCUMENTS

2009/0124205 A1* 5/2009 Aboba ................. H04B 17/382
455/63.1
2012/0300245 A1* 11/2012 Chatierjee .............. H02J 50/10
358/1.14
(Continued)

FOREIGN PATENT DOCUMENTS

CN 103378912 A 10/2013
CN 103782486 A 5/2014
(Continued)

OTHER PUBLICATIONS

1st Office Action of Chinese Application No. 201880001067.3 dated Jun. 2, 2021.
(Continued)

*Primary Examiner* — Wen W Huang
(74) *Attorney, Agent, or Firm* — Syncoda LLC; Feng Ma

(57) ABSTRACT

A communication method includes: receiving out-of-band communication modes supported by a power transmitter (PTX) and transmitted by the PTX via a first communication mode, wherein the first communication mode comprises an enhanced in-band communication mode; matching the out-of-band communication modes supported by the PTX with out-of-band communication modes supported by a power receiver (PRX); and when the out-of-band communication modes supported by the PTX and the out-of-band communication modes supported by the PRX share an identical out-of-band communication mode, using the identical out-band communication mode to return data to the PTX or to return a result of the matching between the out-of-band communication modes to the PTX. Embodiments of the present disclosure can be used to achieve compatibility with multiple communication modes and to support high-speed communication in a wireless charging system.

13 Claims, 10 Drawing Sheets

(51) Int. Cl.
*H04W 4/80* (2018.01)
*H04W 4/20* (2018.01)

(56) References Cited

U.S. PATENT DOCUMENTS

| | | | |
|---|---|---|---|
| 2014/0210406 A1 | 7/2014 | Na et al. | |
| 2014/0342670 A1* | 11/2014 | Kang | H04L 67/303 455/41.2 |
| 2015/0022016 A1* | 1/2015 | Kim | H02J 50/12 307/104 |
| 2015/0061404 A1 | 3/2015 | Lamenza et al. | |
| 2015/0087235 A1* | 3/2015 | Wang | H04W 8/005 455/41.2 |
| 2016/0036498 A1* | 2/2016 | Chu | H04W 52/0229 455/41.1 |
| 2016/0134334 A1 | 5/2016 | Park et al. | |
| 2017/0142687 A1* | 5/2017 | Kim | H04W 72/0453 |
| 2018/0278728 A1* | 9/2018 | Kongovi | H04L 69/24 |
| 2019/0305826 A1* | 10/2019 | Park | H02J 5/00 |
| 2019/0342933 A1* | 11/2019 | Li | H04W 76/15 |
| 2020/0280198 A1* | 9/2020 | Kwon | H04B 5/0081 |

FOREIGN PATENT DOCUMENTS

| | | |
|---|---|---|
| CN | 104335452 A | 2/2015 |
| CN | 105790338 A | 7/2016 |
| CN | 106451684 A | 2/2017 |
| CN | 107636929 A | 1/2018 |
| EP | 2852025 A1 | 3/2015 |
| KR | 20140053758 A | 5/2014 |

OTHER PUBLICATIONS

Extended European Search Report of European Application No. 18927023.4 dated Apr. 23, 2021.
ISA State Intellectual Property Office of the People's Republic of China, International Search Report mailed in Application No. PCT/CN2018/096179, dated Apr. 17, 2019, WIPO, 4 pages.
Zhu Gang, et al., Title: Radio Resource Management of Rail Traffic Broadband Mobile Communication Systems, Apr. 30, 2018, Beijing Jiaotong University Press.

* cited by examiner

COMMUNICATION METHOD AND APPARATUS, POWER RECEIVING DEVICE, AND POWER TRANSMISSION DEVICE

CROSS-REFERENCE TO RELATED APPLICATION

This application is a national stage of International Application No. PCT/CN2018/096179 filed on Jul. 18, 2018, the disclosure of which is hereby incorporated by reference in its entirety.

TECHNICAL FIELD

The present application relates to the field of communication technology, and more particularly, to a communication method and an apparatus, a power receiving device, a power transmitting device, and a computer-readable storage media.

BACKGROUND

At present, wireless power consortium (WPC) standard adopts an in-band communication method, which uses a frequency band around 124 k for necessary handshake communication. Because the information amount of handshake communication is very small, the in-band communication can meet this demand. However, with subsequent evolution and development, the rate of in-band communication is too low to meet new application requirements. Therefore, out-of-band communication needs to be introduced.

At present, the more mature out-of-band communication is a Near Field Communication (NFC) and Bluetooth Low Energy (BLE). For medium power, such as charging pads embedded in kitchen equipment or furniture, NFC currently has an advantage in standardization. For small devices such as mobile phones, the space for the charging pads is very limited, and the location of the NFC antenna will affect the layout of the small devices, so that NFC is not a standard configuration for mobile phones. However, because of its low cost and low power consumption, BLE is basically the standard configuration of mobile phones. Therefore, the BLE communication mode is also a very important communication mode.

However, it is obvious that NFC and BLE cannot be introduced at the same time. If only one communication mode is introduced, and the charging pad corresponds to another communication mode, it will cause incompatibility, and it will not be possible to support relatively high rates in the wireless charging system.

SUMMARY

In view of this, the embodiments of the present disclosure propose a communication method and an apparatus, a power receiving device, a power transmitting device, and a computer-readable storage media to be compatible with multiple communication modes, so as to support relatively high-rate communication in a wireless charging system.

According to a first aspect of the embodiments of the present disclosure, there is provided a communication method, for applying to a power receiver (PRX), the communication method includes: receiving one or more out-of-band communication modes supported by a power transmitter (PTX) transmitted via a first communication mode by the PTX, and the first communication mode comprising an enhanced in-band communication mode; matching the out-of-band communication modes supported by the PTX and one or more out-of-band communication modes supported by the PRX; and returning a data or a matching result that an out-of-band communication mode matches to the PTX via a same out-of-band communication mode, in response to the same out-of-band communication mode existing between the out-of-band communication modes supported by the PTX and the out-of-band communication modes supported by the PRX.

In some embodiments, the method further includes: returning the data or a matching result that an out-of-band communication mode does not match to the PTX via the first communication mode, in response to no same out-of-band communication mode existing between the out-of-band communication modes supported by the PTX and the out-of-band communication modes supported by the PRX.

In some embodiments, the method further includes: before receiving the out-of-band communication modes supported by the PTX transmitted via the first communication mode by the PTX, confirming that the PRX supports the first communication mode; and encoding the out-of-band communication modes supported by the PRX and the first communication mode with a preset encoding mode.

In some embodiments, method further includes: before encoding the out-of-band communication modes supported by the PRX and the first communication mode with the preset encoding mode, negotiating the preset coding mode with the PTX.

According to a second aspect of the embodiments of the present disclosure, there is provided a communication method, for applying to a power transmitter (PTX), and the communication method includes: transmitting one or more out-of-band communication modes supported by the PTX to a power receiver (PRX) via a first communication mode, wherein the first communication mode comprising an enhanced in-band communication mode; receiving a data or a matching result of out-of-band communication returned by the PRX according to the out-of-band communication modes supported by the PTX; and communicating with the PRX via the same out-of-band communication mode, in response to confirming, according to the matching result, that a same out-of-band communication mode exists between the out-of-band communication modes supported by the PTX and the out-of-band communication modes supported by the PRX, or in response to the data being returned via the same out-of-band communication mode supported by both of the PTX and the PRX.

In some embodiments, the method further includes: communicating with the PRX via the first communication mode, in response to confirming, according to the matching result, that no same out-of-band communication mode exists between the out-of-band communication modes supported by the PTX and the out-of-band communication modes supported by the PRX, or in response to the data being returned via the first communication mode.

In some embodiments, the method further includes: before transmitting the out-of-band communication modes supported by the PTX to the PRX via the first communication mode, confirming that the PTX supports the first communication mode; and encoding the first communication mode and one or more out-of-band communication modes supported by the PTX with a preset encoding mode.

In some embodiments, the method further includes: before encoding the out-of-band communication modes supported by the PTX and the first communication mode with the preset encoding mode, negotiating the preset coding mode with the PRX.

In some embodiments, the method further includes: after communicating with the PRX via the same out-of-band communication mode, if it is detected that duration of an interference signal exceeds a preset time period, switching to the first communication mode to communicate with the PRX.

In some embodiments, the method further includes: after switching to the first communication mode to communicate with the PRX, performing a detection of an interference signal for an out-of-band frequency band; and in response to detecting that signal strength of the interference signal drops to or below a preset threshold, communicating with the PRX via the same out-of-band communication mode currently determined when the same out-of-band communication mode exists between the out-of-band communication modes supported by the PTX and the out-of-band communication modes supported by the PRX.

According to a third aspect of the embodiments of the present disclosure, there is provided a communication apparatus, for applying to a power receiver (PRX), and the apparatus includes: a receiving module, configured to receive one or more out-of-band communication modes supported by a power transmitter (PTX) transmitted via a first communication mode by the PTX, and the first communication mode comprising an enhanced in-band communication mode; a matching module, configured to match the out-of-band communication modes supported by the PTX received by the receiving module and one or more out-of-band communication modes supported by the PRX; and a first returning module, configured to return a data or a matching result that an out-of-band communication mode matches to the PTX via a same out-of-band communication mode, in response to the same out-of-band communication mode existing between the out-of-band communication modes supported by the PTX and the out-of-band communication modes supported by the PRX.

In some embodiments, the apparatus further includes a second returning module, configured to return the data or a matching result that an out-of-band communication mode does not match to the PTX via the first communication mode, in response to the matching result of the matching module is that no same out-of-band communication mode existing between the out-of-band communication modes supported by the PTX and the out-of-band communication modes supported by the PRX.

In some embodiments, the apparatus further includes a first confirmation module, configured to confirm that the PRX supports the first communication mode, before the receiving module receiving the out-of-band communication modes supported by the PTX transmitted via the first communication mode by the PTX; and a first encoding module, configured to encode the first communication mode confirmed by the first confirmation module and the out-of-band communication modes supported by the PRX with a preset encoding mode.

In some embodiments, the apparatus further includes a first negotiating module, configured to negotiate the preset coding mode with the PTX, before the first encoding module encoding the out-of-band communication modes supported by the PRX and the first communication mode with the preset encoding mode.

According to a fourth aspect of the embodiments of the present disclosure, there is provided a communication apparatus, for applying to a power transmitter (PTX), and the apparatus includes: a transmitting module, configured to transmit one or more out-of-band communication modes supported by the PTX to a power receiver (PRX) via a first communication mode, wherein the first communication mode comprising an enhanced in-band communication mode; a receiving module, configured to receive a data or a matching result of out-of-band communication returned by the PRX according to the out-of-band communication modes supported by the PTX transmitted by the transmitting module; and a first communication module, configured to communicate with the PRX via the same out-of-band communication mode, in response to confirming, according to the matching result received by the receiving module, that a same out-of-band communication mode exists between the out-of-band communication modes supported by the PTX and the out-of-band communication modes supported by the PRX, or in response to the data being returned via the same out-of-band communication mode supported by both of the PTX and the PRX.

In some embodiments, the apparatus further includes a second communication module, configured to communicate with the PRX via the first communication mode, in response to confirming, according to the matching result received by the receiving module, that no same out-of-band communication mode exists between the out-of-band communication modes supported by the PTX and the out-of-band communication modes supported by the PRX, or in response to the data being returned via the first communication mode.

In some embodiments, the apparatus further includes a second confirmation module, configured to confirm that the PTX supports the first communication mode before the transmitting module transmitting the out-of-band communication modes supported by the PTX to the PRX via the first communication mode; and a second encoding module, configured to encode the first communication mode confirmed by the second confirmation module and one or more out-of-band communication modes supported by the PTX with a preset encoding mode.

In some embodiments, the apparatus further includes a second negotiating module, configured to negotiate the preset encoding with the PRX before the second encoding module encoding the out-of-band communication modes supported by the PTX and the first communication mode with the preset encoding mode.

In some embodiments, the apparatus further includes a detection switching module, configured to: after the first communication module communicating with the PRX via the same out-of-band communication mode, if it is detected that duration of an interference signal exceeds a preset time period, switch to the first communication mode to communicate with the PRX.

In some embodiments, the apparatus further includes a detection module, configured to perform a detection of an interference signal for an out-of-band frequency band after the detection switching module switching to the first communication mode to communicate with the PRX; and a third communication module, configured to: in response to detecting that signal strength of the interference signal detected by the detection module drops to or below a preset threshold, communicate with the PRX via the same out-of-band communication mode currently determined when the same out-of-band communication mode exists between the out-of-band communication modes supported by the PTX and the out-of-band communication modes supported by the PRX.

According to a fifth aspect of the embodiments of the present disclosure, there is provided a power receiving device, the power receiving device includes a processor; and memory for storing instructions executable by the processor; wherein the processor is configured to: receive one or more out-of-band communication modes supported by a power transmitter (PTX) transmitted by the PTX via a first communication mode, and the first communication mode comprising an enhanced in-band communication mode; match the out-of-band communication modes supported by the PTX and one or more out-of-band communication modes supported by the PRX; and return a data or a matching result that an out-of-band communication mode matches to the PTX via a same out-of-band communication mode, in response to the same out-of-band communication mode existing between the out-of-band communication modes supported by the PTX and the out-of-band communication modes supported by the PRX.

According to a sixth aspect of the embodiments of the present disclosure, there is provided a power transmitting device, the power transmitting device includes: a processor; and memory for storing instructions executable by the processor; wherein the processor is configured to: transmit one or more out-of-band communication modes supported by the PTX to a power receiver (PRX) via a first communication mode, wherein the first communication mode comprising an enhanced in-band communication mode; receive a data or a matching result of out-of-band communication returned by the PRX according to the out-of-band communication modes supported by the PTX; and communicate with the PRX via the same out-of-band communication mode, in response to confirming, according to the matching result, that a same out-of-band communication mode exists between the out-of-band communication modes supported by the PTX and the out-of-band communication modes supported by the PRX, or in response to the data being returned via the same out-of-band communication mode supported by both of the PTX and the PRX.

According to a seventh aspect, there is provided a computer-readable storage medium having computer instructions stored thereon, when the instructions are executed by a processor, the steps of the above communication method are implemented.

According to an eighth aspect, there is provided a computer-readable storage medium having computer instructions stored thereon, when the instructions are executed by a processor, the steps of the above communication method are implemented.

The technical solutions provided by the embodiments of the present disclosure may include the following beneficial effects:

In the above embodiment, by receiving one or more out-of-band communication modes supported by the PTX transmitted via a first communication mode by the PTX; matching the out-of-band communication modes supported by the PTX and the out-of-band communication modes supported by the PRX; and via a same out-of-band communication mode, returning a data to the PTX or returning a matching result of the out-of-band communication to the PTX, in response to the same out-of-band communication mode exists between the out-of-band communication modes supported by the PTX and the out-of-band communication modes supported by the PRX, it is possible for the PTX communicating with the PRX via the same out-of-band communication mode, based on content returned by the PRX, so as to achieve the purpose of compatible with multiple communication modes and support relatively high-rate communication in the wireless charging system.

In the above embodiment, by transmitting, via a first communication mode, out-of-band communication modes supported by the power transmitter (PTX) to a power receiver (PRX); receiving a data or a matching result of out-of-band communication returned by the PRX according to the out-of-band communication modes supported by the PTX; communicating with the PRX via the same out-of-band communication mode, when it is confirmed according to the matching result that the same out-of-band communication mode exists between the out-of-band communication modes supported by the PTX and the out-of-band communication modes supported by the PRX, or the data is returned via the same out-of-band communication mode supported by both of the PTX and the PRX, it is possible to achieve to be compatible with a variety of communication modes, and to support relatively high-rate communication in the wireless charging system.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a part of the specification, show embodiments in accordance with the present disclosure, and together with the specification are used to explain the principle of the present disclosure.

DETAILED DESCRIPTION

Here, exemplary embodiments will be described in detail, and examples thereof are shown in the accompanying drawings. When the following description refers to the accompanying drawings, unless otherwise indicated, the same numbers in different drawings represent the same or similar elements. The implementation manners described in the following exemplary embodiments do not represent all implementations consistent with the present disclosure. Rather, they are merely examples of devices and methods consistent with some aspects of the present disclosure as detailed in the appended claims.

Figure 1:
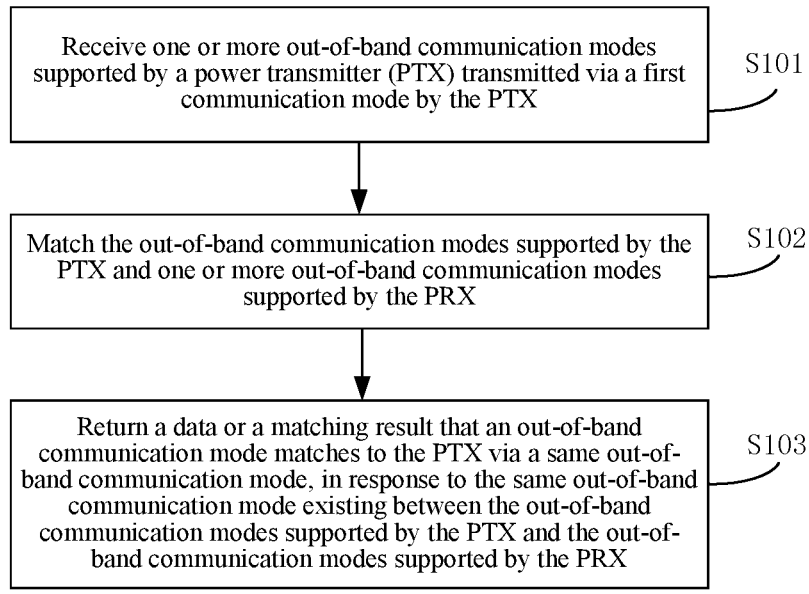
FIG. 1 is a flowchart of a communication method shown in an exemplary embodiment of the present disclosure.

FIG. 1 is a flowchart of a communication method shown in an exemplary embodiment of the present disclosure. This embodiment is described from a power receiver (PRX) side. As shown in FIG. 1, the communication method includes the following steps.

In step S101, one or more out-of-band communication modes supported by a power transmitter (PTX) transmitted by the PTX via a first communication mode are received, and the first communication mode includes an enhanced in-band communication mode.

Optionally, before receiving the out-of-band communication modes supported and transmitted by the power transmitter (PTX) via the first communication mode, the method may further include: confirming that the power receiver (PRX) supports the first communication mode, and encoding one or more out-of-band communication modes supported by the PRX and the first communication mode with a preset encoding mode. Encoding one or more out-of-band communication modes supported by the PRX and the first communication mode by using the preset encoding mode can provide conditions for subsequent determination of whether or not same out-of-band communication mode exists between the out-of-band communication modes supported by the PTX and the out-of-band communication modes supported by the PRX according to encoding information.

In addition, before encoding the out-of-band communication modes supported by the PRX and the first communication mode by using the preset coding mode, the method may further include: negotiating the preset coding mode with the PTX. By negotiating the preset encoding mode with the PTX, conditions can be provided for subsequent identification of one or more communication modes supported by a peer side.

Assuming that PRX supports BLE, NFC and an enhanced in-band communication mode, said three modes can be encoded as shown in Table 1.

TABLE 1

Communication modes supported by the PRX and their corresponding coding information

| Coding information | communication modes |
|---|---|
| 00 | BLE |
| 01 | NFC |
| 10 | enhanced in-band |
| 11 | reserved |

In step S102, the out-of-band communication modes supported by the PTX and one or more out-of-band communication modes supported by the PRX are matched.

In step S103, when a same out-of-band communication mode exists between the out-of-band communication modes supported by the PTX and the out-of-band communication modes supported by the PRX, a data or a matching result that an out-of-band communication mode matches is returned to the PTX via the same out-of-band communication mode.

After matching, by the PRX, the out-of-band communication modes supported by the PTX and the out-of-band communication modes supported by the PRX, when the same out-of-band communication mode exists between the out-of-band communication modes supported by the PTX and the out-of-band communication modes supported by the PRX, then, through the same out-of-band communication mode, the data can be returned to the PTX or the matching result that an out-of-band communication mode matches can be returned to the PTX.

In the above embodiment, by receiving one or more out-of-band communication modes supported by the PTX transmitted via a first communication mode by the PTX; matching the out-of-band communication modes supported by the PTX and the out-of-band communication modes supported by the PRX; and via the same out-of-band communication mode, returning a data to the PTX or returning a matching result of the out-of-band communication to the PTX, in response to a same out-of-band communication mode exists between the out-of-band communication modes supported by the PTX and the out-of-band communication modes supported by the PRX, it is possible for the PTX communicating with the PRX via the same out-of-band communication mode, based on content returned by the PRX, so as to achieve the purpose of compatible with multiple communication modes and support relatively high-rate communication in the wireless charging system.

Figure 2:
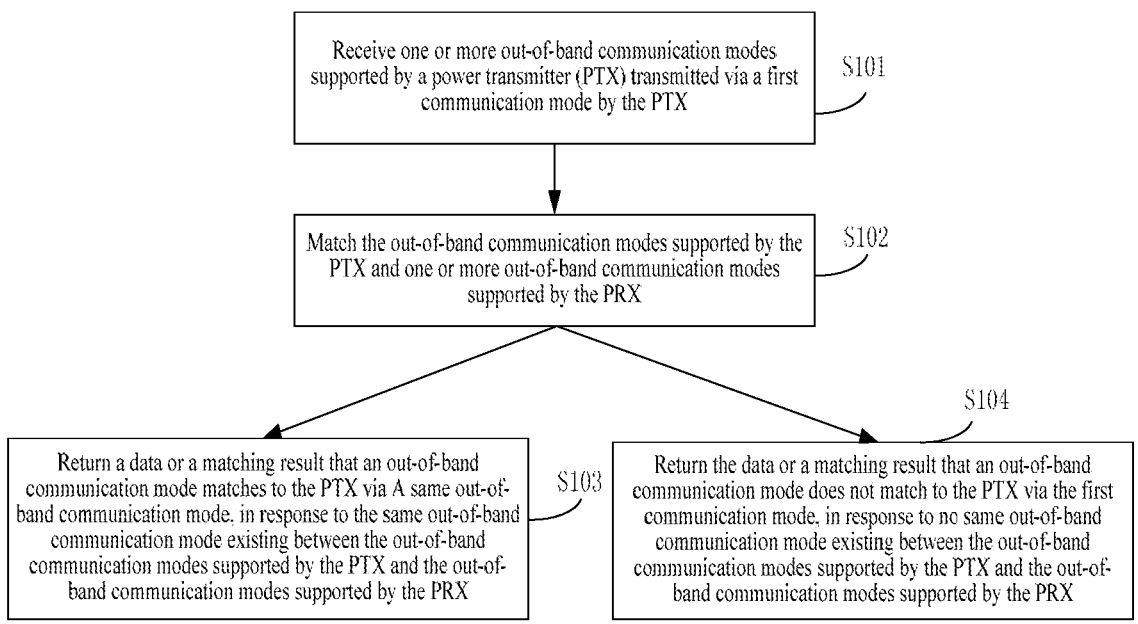
FIG. 2 is a flowchart of another communication method shown in an exemplary embodiment of the present disclosure.

FIG. 2 is a flowchart of another communication method shown in an exemplary embodiment of the present application. As shown in FIG. 2, after step S102, the method may further include the following steps.

In step S104, when no same out-of-band communication mode exists between the out-of-band communication modes supported by the PTX and the out-of-band communication modes supported by the PRX, the data or a matching result that an out-of-band communication mode does not match is returned to the PTX via the first communication mode.

In this embodiment, when no same out-of-band communication mode exists between the out-of-band communication modes supported by the PTX and the out-of-band communication modes supported by the PRX, the data can be returned to PTX through the first communication mode, namely the enhanced in-band communication mode, or the matching result that an data out-of-band communication mode does not match can be returned to PTX through the first communication mode, namely the enhanced in-band communication mode.

In the above embodiment, when no same out-of-band communication mode exists between the out-of-band communication modes supported by the PTX and the out-of-band communication modes supported by the PRX, returning the data to the PTX through the first communication mode or returning the matching result of the out-of-band communication mismatch to the PTX through the first communication mode, enable the PTX, according to the content returned by the PRX, to communicate with the PRX via the first communication mode. Since the communication rate of the first communication mode is higher than that of general in-band communication modes, it is possible to support a relatively high rate communication in the wireless charging system.

Figure 3:
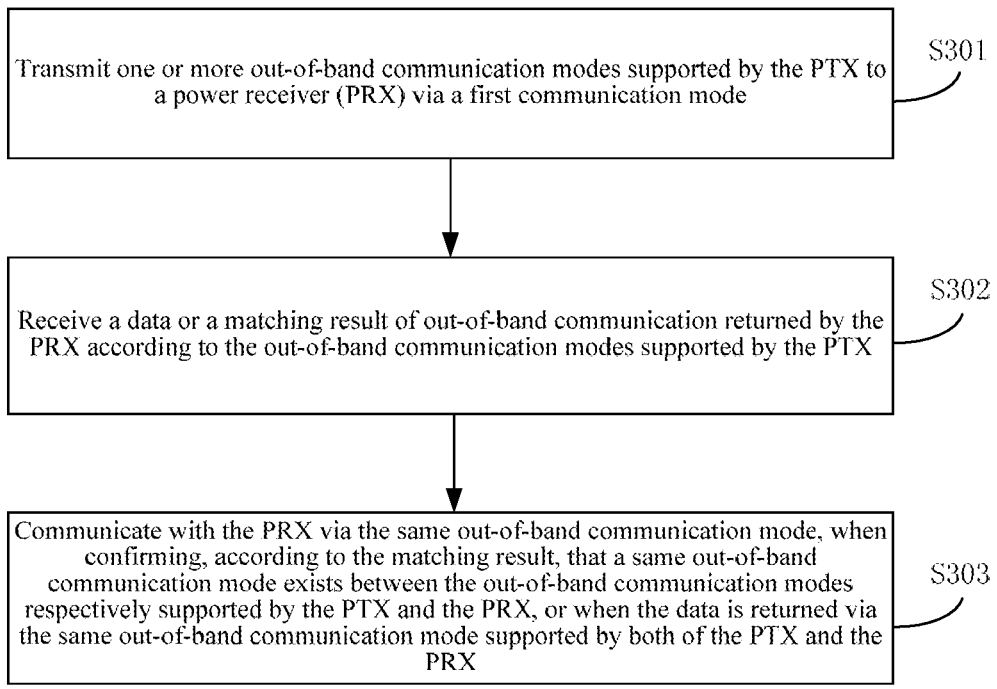
FIG. 3 is a flowchart of another communication method shown in an exemplary embodiment of the present disclosure.

FIG. 3 is a flowchart of another communication method shown in an exemplary embodiment of the present disclosure. This embodiment is described from a power transmitter (PTX) side. As shown in FIG. 3, the communication method includes the following steps.

In step S301, one or more out-of-band communication modes supported by the power transmitter (PTX) are transmitted to a power receiver (PRX) via a first communication mode, wherein the first communication mode includes an enhanced in-band communication mode.

Optionally, before transmitting, through the first communication mode, the out-of-band communication modes supported by the PTX to the power receiver PRX, the method may further include: confirming that the PTX supports the first communication mode, and encoding one or more out-of-band communication modes supported by the PTX and the first communication mode with a preset encoding mode. Encoding the out-of-band communication modes supported by the PTX and the first communication mode by using the preset encoding mode can provide conditions for subsequent determination of whether or not same out-of-band communication mode exists between the out-of-band communication modes supported by the PTX and the out-of-band communication modes supported by the PRX according to encoding information.

In addition, optionally, the method may further include: before encoding and the out-of-band communication modes supported by the PTX and the first communication mode by using the preset coding mode, the method may further include: negotiating the preset coding mode with the PRX. By negotiating the preset encoding mode with the PRX, conditions can be provided for subsequent identification of one or more communication modes supported by a peer side.

In step S302, a data or a matching result of out-of-band communication returned by the PRX according to the out-of-band communication modes supported by the PTX is received.

In step S303, if it is confirmed according to the matching result that a same out-of-band communication mode exists between the out-of-band communication modes supported by the PTX and the out-of-band communication modes supported by the PRX, or the data is returned via the same out-of-band communication mode supported by both of the PTX and the PRX, then the PTX is communicated with the PRX via the same out-of-band communication mode. As understood by those skilled in the art, when a terminal receives data sent in a certain communication mode, it can be understood that the terminal supports this communication mode.

In the above embodiment, by transmitting, via a first communication mode, out-of-band communication modes supported by the power transmitter (PTX) to a power receiver (PRX); receiving a data or a matching result of out-of-band communication returned by the PRX according to the out-of-band communication modes supported by the PTX; communicating with the PRX via the same out-of-band communication mode, when it is confirmed according to the matching result that the same out-of-band communication mode exists between the out-of-band communication modes supported by the PTX and the out-of-band communication modes supported by the PRX, or the data is returned via the same out-of-band communication mode supported by both of the PTX and the PRX, it is possible to achieve to be compatible with a variety of communication modes, and to support relatively high-rate communication in the wireless charging system.

Figure 4:
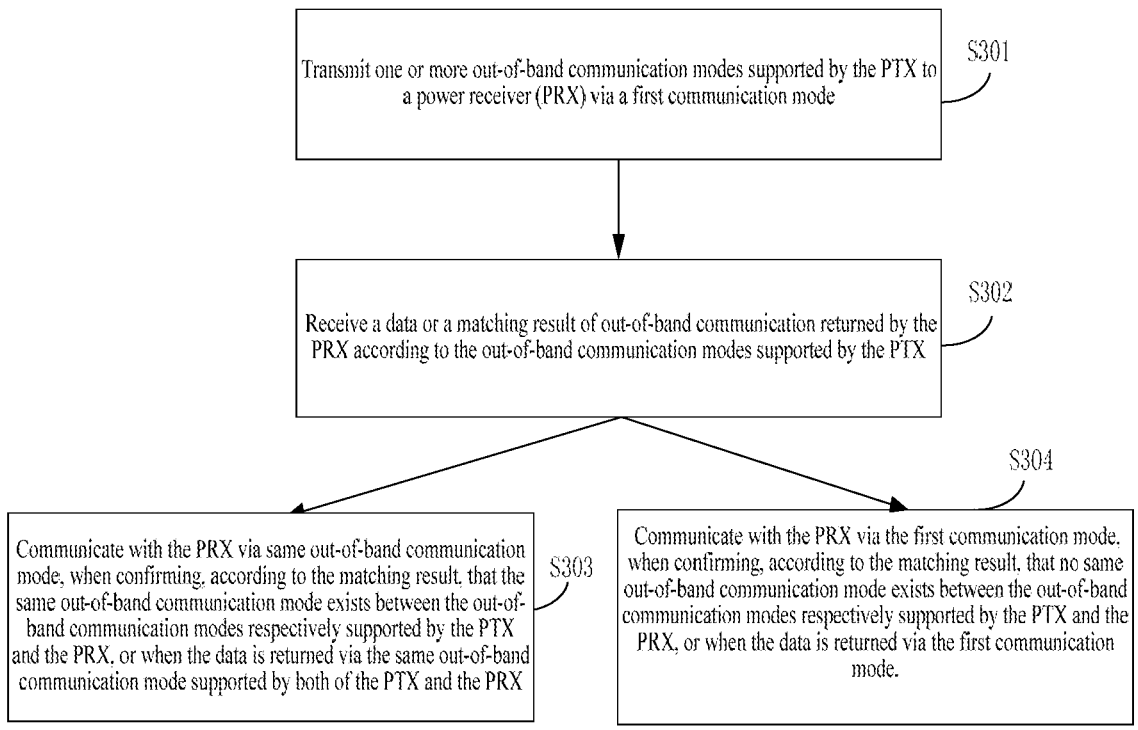
FIG. 4 is a flowchart of another communication method shown in an exemplary embodiment of the present disclosure.

FIG. 4 is a flowchart of another communication method shown in an exemplary embodiment of the present disclosure. As shown in FIG. 4, after the above step S302, the communication method may further include the following steps.

In step S304, in response to confirming, according to the matching result, that no same out-of-band communication mode exists between the out-of-band communication modes supported by the PTX and the out-of-band communication modes supported by the PRX, or in response to that the data is returned via the first communication mode, the PTX is communicated with the PRX via the first communication mode.

In this embodiment, when it is confirmed, by the PTX, that no same out-of-band communication mode exists between the out-of-band communication modes supported by the PTX and the out-of-band communication modes supported by the PRX, or the data is returned by the PRX via the first communication mode, then the PTX is communicated with the PRX via the first communication mode.

In the above embodiment, if it is confirmed according to the matching result that no same out-of-band communication mode exists between the out-of-band communication modes supported by the PTX and the out-of-band communication modes supported by the PRX, or the data is returned via the first communication mode, then the PTX is communicated with the PRX via the first communication mode. Since the communication rate of the first communication mode is higher than that of general in-band communication modes, it is possible to support a relatively high rate communication in the wireless charging system.

Figure 5:
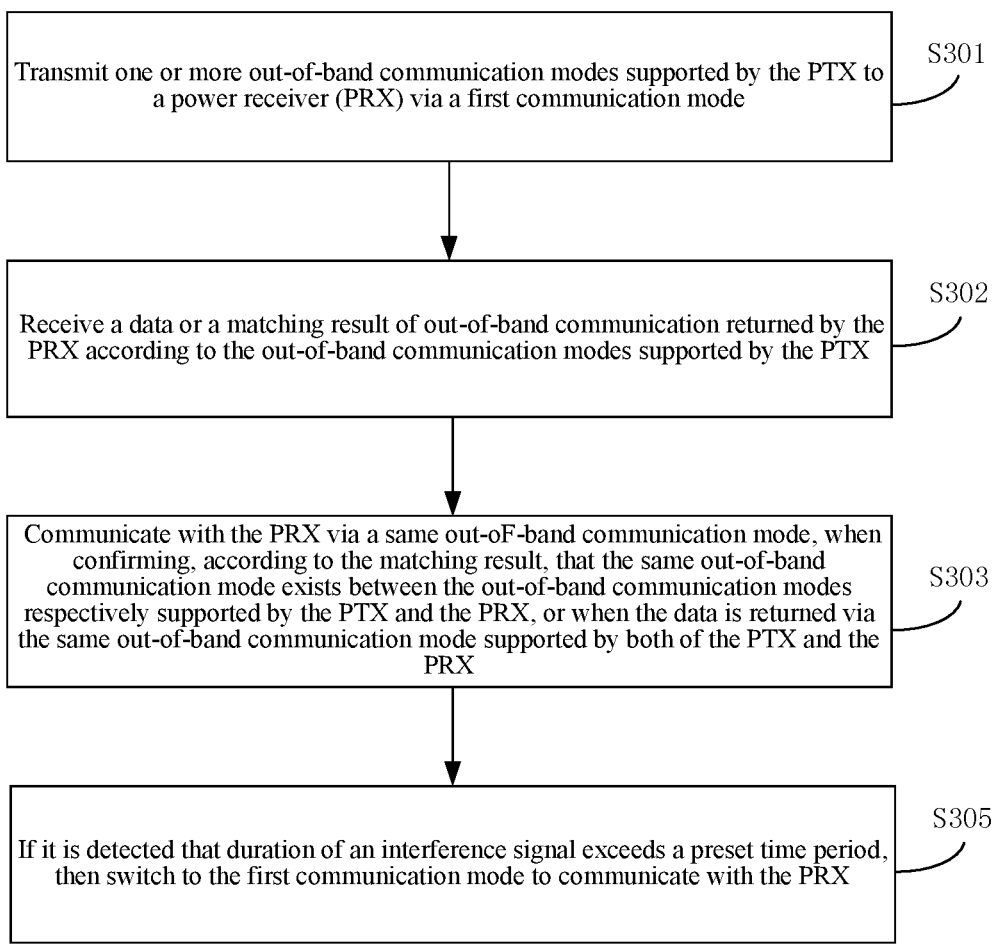
FIG. 5 is a flowchart of another communication method shown in an exemplary embodiment of the present disclosure.

FIG. 5 is a flowchart of another communication method shown in an exemplary embodiment of the present disclosure. As shown in FIG. 5, after the above step S303, the communication method may further include the following steps.

In step S305, if it is detected that duration of an interference signal exceeds a preset time period, it is switched to the first communication mode to communicate with the PRX.

In this embodiment, if the PTX is interfered in the out-of-band communication and the duration of the interference exceeds the preset time period, it can fall back to the in-band communication, that is, switch to the first communication mode to communicate with the PRX.

In the above embodiment, if it is detected that the duration of the interference signal exceeds the preset time period, it switches to the first communication mode to communicate with the PRX, so as to ensure communication quality while supporting relatively high-rate communication.

Figure 6:
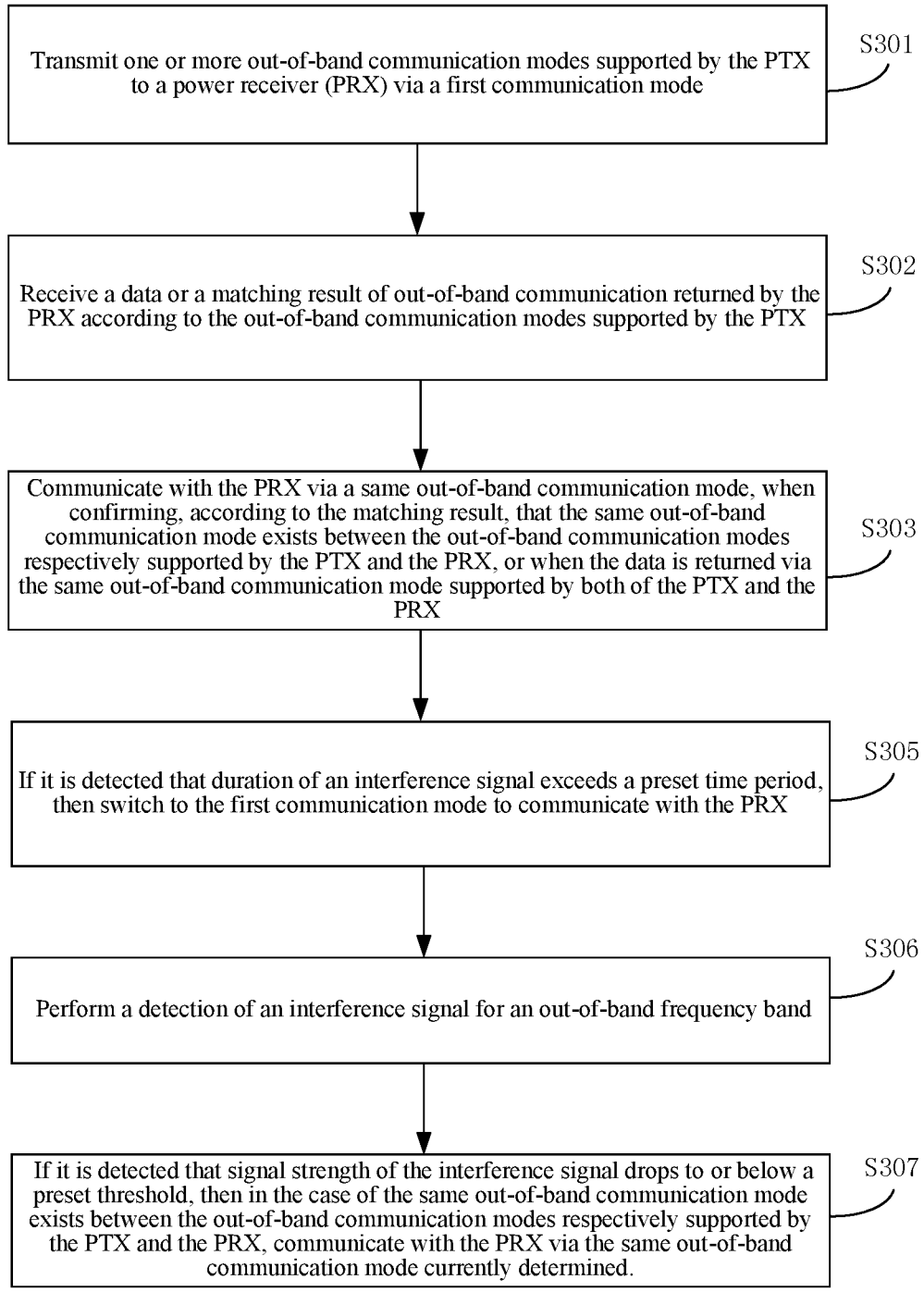
FIG. 6 is a flowchart of another communication method shown in an exemplary embodiment of the present disclosure.

FIG. 6 is a flowchart of another communication method shown in an exemplary embodiment of the present disclosure. As shown in FIG. 6, after the above step S305, the communication method may further include the following steps.

In step S306, a detection of an interference signal is performed for an out-of-band frequency band.

In step S307, in response to detecting that signal strength of the interference signal drops to or below a preset threshold, the PTX is communicated with the PRX via the same out-of-band communication mode currently determined, when the same out-of-band communication method exists between the out-of-band communication modes supported by the PTX and the out-of-band communication modes supported by the PRX.

In the above-mentioned embodiment, by performing the detection of the interference signal for the out-of-band frequency band, and in response to detecting that signal strength of the interference signal drops to or below the preset threshold, when the same out-of-band communication mode exists between the out-of-band communication modes supported by the PTX and the out-of-band communication modes supported by the PRX, communicating with the PRX via the same out-of-band communication mode currently determined, it is possible to improve the communication rate while ensuring the communication quality.

Figure 7:
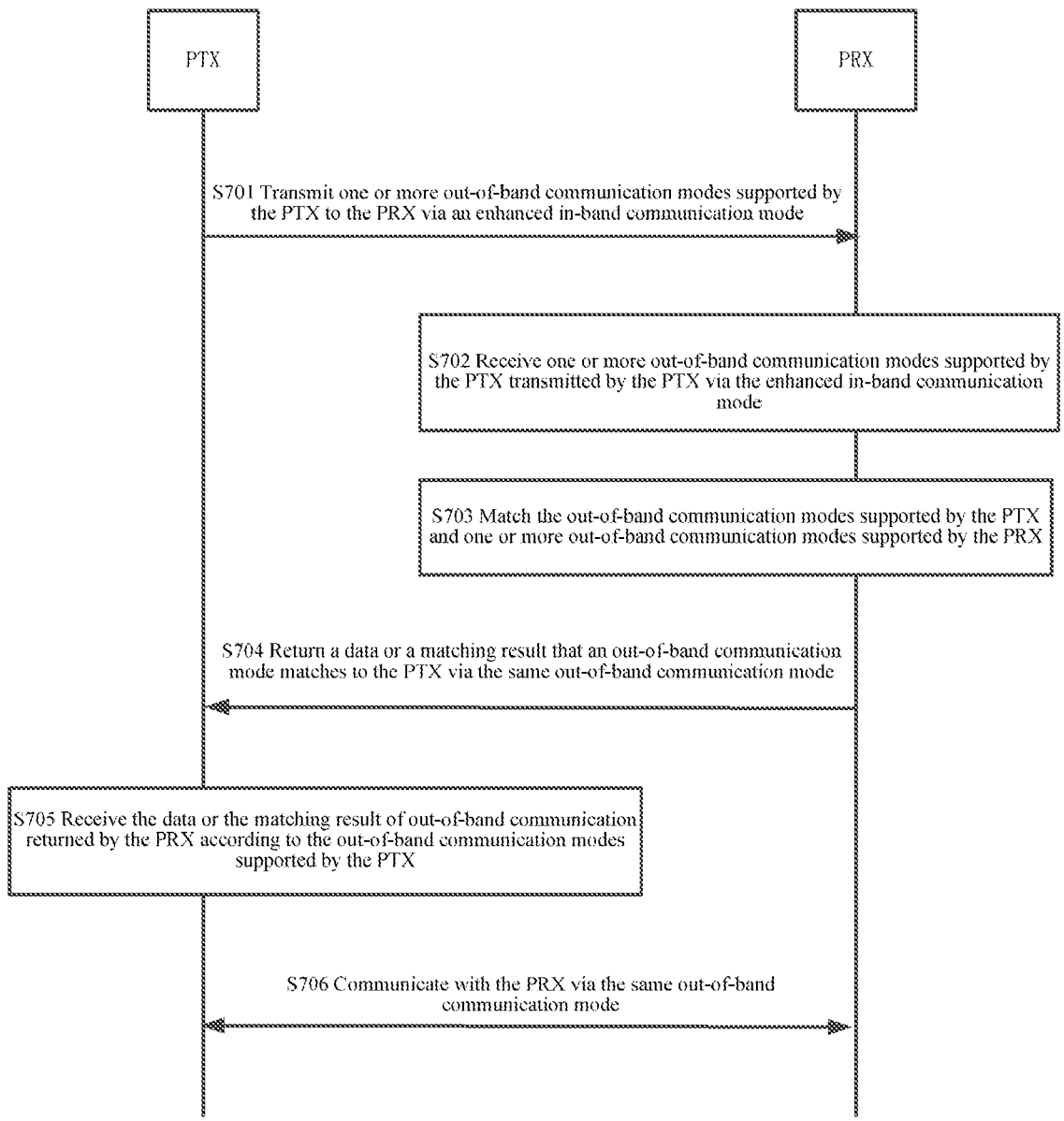
FIG. 7 is a signaling flowchart of a communication method shown in an exemplary embodiment of the present disclosure.

FIG. 7 is a signaling flowchart of a communication method shown in an exemplary embodiment of the present disclosure. This embodiment is described from the perspective of an interaction between a power transmitter (PTX) and a power receiver (PRX). As shown in FIG. 7, the communication method includes the following steps.

In step S701, one or more out-of-band communication modes supported by the PTX are transmitted by the PTX to the PRX via an enhanced in-band communication mode.

In step S702, one or more out-of-band communication modes supported by the PTX transmitted by the PTX via the enhanced in-band communication mode are received by the PRX.

In step S703, the out-of-band communication modes supported by the PTX and one or more out-of-band communication modes supported by the PRX are matched by the PRX.

In step S704, when a same out-of-band communication mode exists between the out-of-band communication modes supported by the PTX and the out-of-band communication modes supported by the PRX, a data or a matching result that an out-of-band communication mode matches is returned by the PRX to the PTX via the same out-of-band communication mode.

In step S705, the data or the matching result of out-of-band communication returned by the PRX according to the out-of-band communication modes supported by the PTX is received by the PTX.

In step S706, if it is confirmed, by the PTX, according to the matching result that the same out-of-band communication mode exists between the out-of-band communication modes supported by the PTX and the out-of-band communication modes supported by the PRX, or the data is returned via the same out-of-band communication mode supported by both of the PTX and the PRX, then the PTX is communicated with the PRX via the same out-of-band communication mode.

In the above-mentioned embodiment, through the interaction between the PRX and the PTX, it is possible to achieve to be compatible with multiple communication modes and supports relatively high-rate communication in the wireless charging system.

Figure 8:
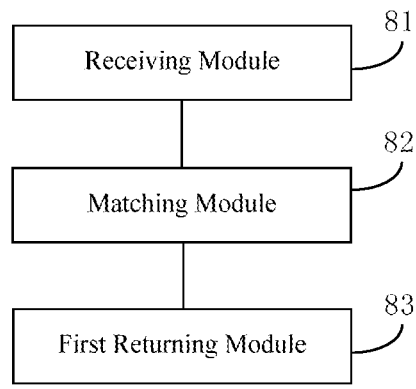
FIG. 8 is a block diagram of a communication apparatus shown in an exemplary embodiment of the present disclosure.

FIG. 8 is a block diagram of a communication apparatus shown in an exemplary embodiment of the present disclosure. The communication apparatus may be located in the PRX. As shown in FIG. 8, the communication apparatus includes a receiving module 81, a matching module 82 and a first returning module 83.

The receiving module 81 is configured to receive one or more out-of-band communication modes supported by a power transmitter (PTX) transmitted by the PTX via a first communication mode, and the first communication mode comprising an enhanced in-band communication mode.

the matching module 82 is configured to match the out-of-band communication modes supported by the PTX received by the receiving module 81 and one or more out-of-band communication modes supported by the PRX.

the first returning module 83 is configured to return a data or a matching result that an out-of-band communication mode matches to the PTX via the same out-of-band communication mode, when the matching result of the matching module 82 is that a same out-of-band communication mode exists between the out-of-band communication modes supported by the PTX and the out-of-band communication modes supported by the PRX.

After matching, by the PRX, the out-of-band communication modes supported by the PTX with the out-of-band communication modes supported by itself, when a same out-of-band communication mode exists between the out-of-band communication modes supported by the PRX and the out-of-band communication modes supported by the PTX, a data can be returned to the PTX via the same out-of-band communication mode, and the matching result that an out-of-band communication matches can also be returned to the PTX via the same out-of-band communication mode.

In the above embodiment, by receiving one or more out-of-band communication modes supported by the PTX transmitted via a first communication mode by the PTX; matching the out-of-band communication modes supported by the PTX and the out-of-band communication modes supported by the PRX; and via the same out-of-band communication mode, returning the data to the PTX or returning the matching result of the out-of-band communication to the PTX, in response to the same out-of-band communication mode exists between the out-of-band communication modes supported by the PTX and the out-of-band communication modes supported by the PRX, it is possible for the PTX communicating with the PRX via the same out-of-band communication mode, based on content returned by the PRX, so as to achieve the purpose of compatible with multiple communication modes and support relatively high-rate communication in the wireless charging system.

Figure 9:
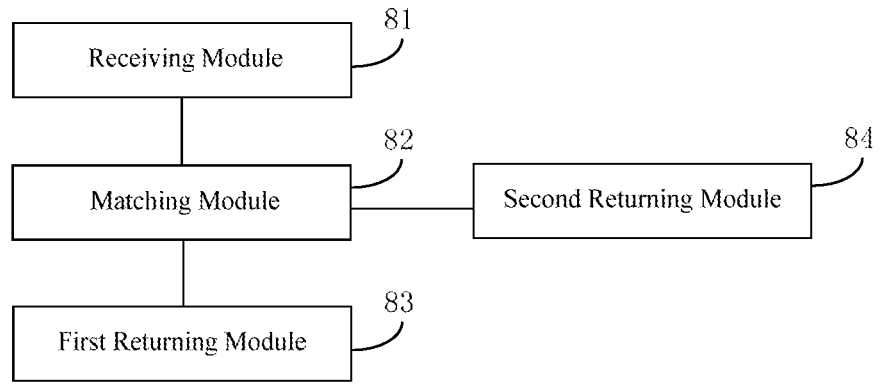
FIG. 9 is a block diagram showing another communication apparatus according to an exemplary embodiment.

FIG. 9 is a block diagram showing another communication apparatus according to an exemplary embodiment. As shown in FIG. 9, on the basis of the above-mentioned embodiment shown in FIG. 8, the apparatus may further include a second returning module 84.

The second returning module 84 is configured to return the data or a matching result that an out-of-band communication mode does not match to the PTX via the first communication mode, when the matching result of the matching module 82 is that no same out-of-band communication mode exists between the out-of-band communication modes supported by the PTX and the out-of-band communication modes supported by the PRX.

In this embodiment, when no same out-of-band communication mode exists between the out-of-band communication modes supported by the PTX and the out-of-band communication modes supported by the PRX, the data can be returned to the PTX via the first communication mode, namely the enhanced in-band communication mode, or a matching result that an out-of-band communication does not match can also be returned to the PTX via the first communication mode.

In the above-mentioned embodiment, when no same out-of-band communication mode exists between the out-of-band communication modes supported by the PTX and the out-of-band communication modes supported by the PRX, returning the data to the PTX through the first communication mode or returning the matching result of the out-of-band communication mismatch to the PTX through the first communication mode, enable the PTX, according to the content returned by the PRX, to communicate with the PRX via the first communication mode. Since the communication rate of the first communication mode is higher than that of general in-band communication modes, it is possible to support a relatively high rate communication in the wireless charging system.

Figure 10:
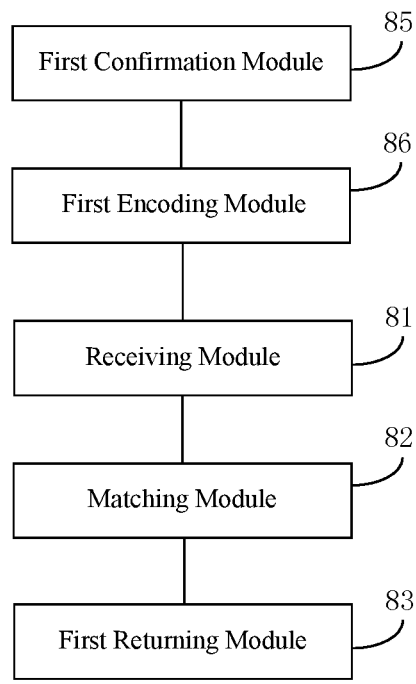
FIG. 10 is a block diagram showing another communication apparatus according to an exemplary embodiment.

FIG. 10 is a block diagram showing another communication apparatus according to an exemplary embodiment. As shown in FIG. 10, based on the embodiment shown in FIG. 8, the apparatus may further include a first confirmation module 85 and a first encoding module 86.

The first confirmation module 85 is configured to: confirm that the PRX supports the first communication mode, before the receiving module 81 receiving the out-of-band communication modes supported by the PTX transmitted via the first communication mode by the PTX.

The first encoding module 86 is configured to encode the first communication mode confirmed by the first confirmation module 85 and the out-of-band communication modes supported by the PRX with a preset encoding mode.

In the above-mentioned embodiment, the out-of-band communication modes supported by the PRX and the first communication mode can be encoded by using a preset encoding mode, which can be used to subsequently determine whether or not there is the same out-of-band communication mode exists between the out-of-band communication modes supported by the PTX and the out-of-band communication modes supported by the PRX according to the encoding information.

Figure 11:
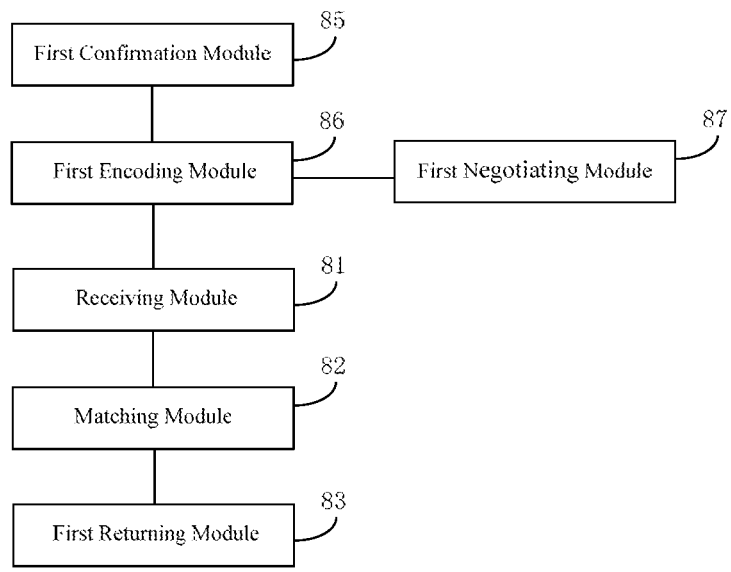
FIG. 11 is a block diagram showing another communication apparatus according to an exemplary embodiment.

FIG. 11 is a block diagram showing another communication apparatus according to an exemplary embodiment. As shown in FIG. 11, based on the embodiment shown in FIG. 10, the apparatus may further include a first negotiating module 87.

The first negotiating module 87 is configured to negotiate the preset coding mode with the PTX, before the first encoding module 86 encoding the out-of-band communication modes supported by the PRX and the first communication mode with the preset encoding mode.

In the above-mentioned embodiment, by negotiating the preset encoding method with the PTX, conditions can be provided for subsequent identification of the communication modes supported by the peer side.

Figure 12:
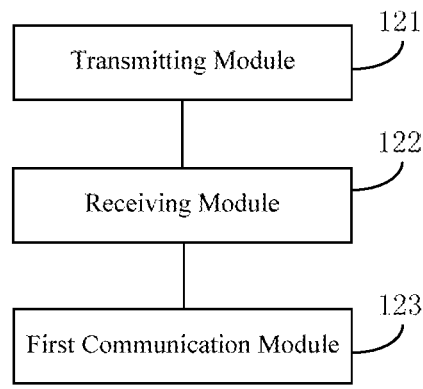
FIG. 12 is a block diagram showing another communication apparatus according to an exemplary embodiment.

FIG. 12 is a block diagram showing another communication apparatus according to an exemplary embodiment. The apparatus may be located in a power transmitter (PTX), and the apparatus includes a transmitting module 121, a receiving module 122 and a first communication module 123.

The transmitting module 121 is configured to transmit one or more out-of-band communication modes supported by the PTX to a power receiver (PRX) via a first communication mode, wherein the first communication mode includes an enhanced in-band communication mode.

The receiving module 122 is configured to receive a data or a matching result of out-of-band communication returned by the PRX according to the out-of-band communication modes supported by the PTX transmitted by the transmitting module 121.

The first communication module 123 is configured to communicate with the PRX via the same out-of-band communication mode, in response to confirming, according to the matching result received by the receiving module 122, that a same out-of-band communication mode exists between the out-of-band communication modes supported by the PTX and the out-of-band communication modes supported by the PRX, or in response to the data is returned via the same out-of-band communication mode supported by both of the PTX and the PRX.

In the above embodiment, by transmitting, via the first communication mode, out-of-band communication modes supported by the power transmitter (PTX) to a power receiver (PRX); receiving the data or the matching result of out-of-band communication returned by the PRX according to the out-of-band communication modes supported by the PTX; communicating with the PRX via the same out-of-band communication mode, when it is confirmed according to the matching result that the same out-of-band communication mode exists between the out-of-band communication modes supported by the PTX and the out-of-band communication modes supported by the PRX, or the data is returned via the same out-of-band communication mode supported by both of the PTX and the PRX, it is possible to achieve to be compatible with a variety of communication modes, and to support relatively high-rate communication in the wireless charging system.

Figure 13:
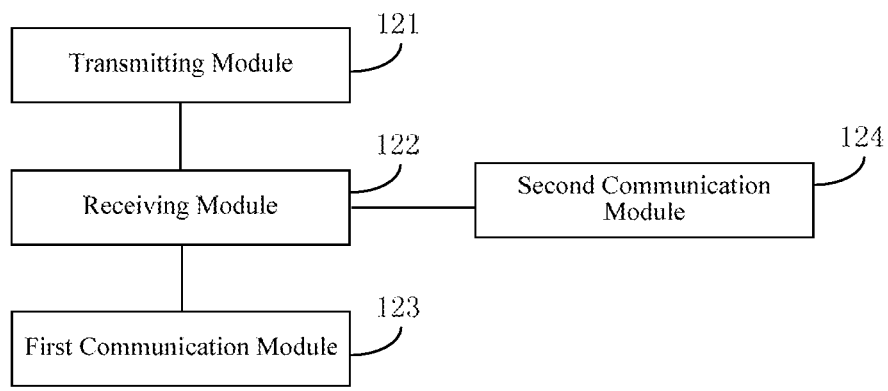
FIG. 13 is a block diagram showing another communication apparatus according to an exemplary embodiment.

FIG. 13 is a block diagram showing another communication apparatus according to an exemplary embodiment. As shown in FIG. 13, on the basis of the embodiment shown in FIG. 12, the apparatus may further include a second communication module 124.

The second communication module 124 is configured to communicate with the PRX via the first communication mode, in response to confirming, according to the matching result received by the receiving module 122, that no same out-of-band communication mode exists between the out-of-band communication modes supported by the PTX and the out-of-band communication modes supported by the PRX, or in response to that the data is returned via the first communication mode.

In this embodiment, when it is confirmed, by the PTX, that no same out-of-band communication mode exists between the out-of-band communication modes supported by the PTX and the out-of-band communication modes supported by the PRX, or the data is returned by the PRX via the first communication mode, then the PTX is communicated with the PRX via the first communication mode.

In the above embodiment, if it is confirmed according to the matching result that no same out-of-band communication mode exists between the out-of-band communication modes supported by the PTX and the out-of-band communication modes supported by the PRX, or the data is returned via the first communication mode, then the PTX is communicated with the PRX via the first communication mode. Since the communication rate of the first communication mode is higher than that of general in-band communication modes, it is possible to support a relatively high rate communication in the wireless charging system.

Figure 14:
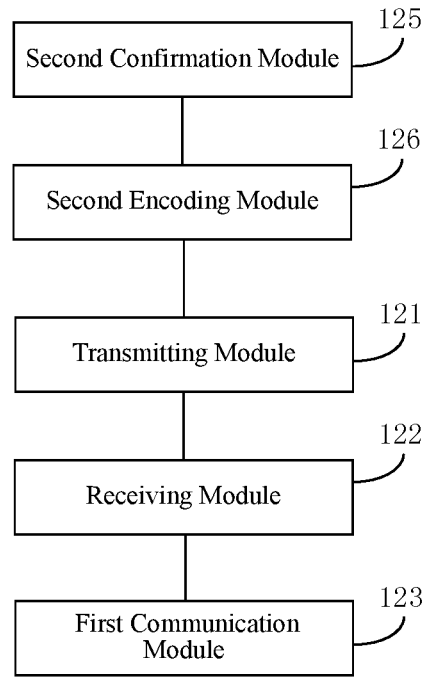
FIG. 14 is a block diagram showing another communication apparatus according to an exemplary embodiment.

FIG. 14 is a block diagram showing another communication apparatus according to an exemplary embodiment. As shown in FIG. 14, based on the embodiment shown in FIG. 12, the apparatus may further include a second confirmation module 125 and a second encoding module 126.

The second confirmation module 125 is configured to confirm that the PTX supports the first communication mode before the transmitting module 121 transmitting the out-of-band communication modes supported by the PTX to the PRX via the first communication mode.

The second encoding module 126 is configured to encode the first communication mode confirmed by the second confirmation module 125 and one or more out-of-band communication modes supported by the PTX with a preset encoding mode.

In the above embodiment, the out-of-band communication modes supported by the PTX and the first communication mode can be encoded by using the preset encoding mode, which can provide conditions for subsequent determination of whether or not a same out-of-band communication mode exists between the out-of-band communication modes supported by the PTX and the out-of-band communication modes supported by the PRX according to encoding information.

Figure 15:
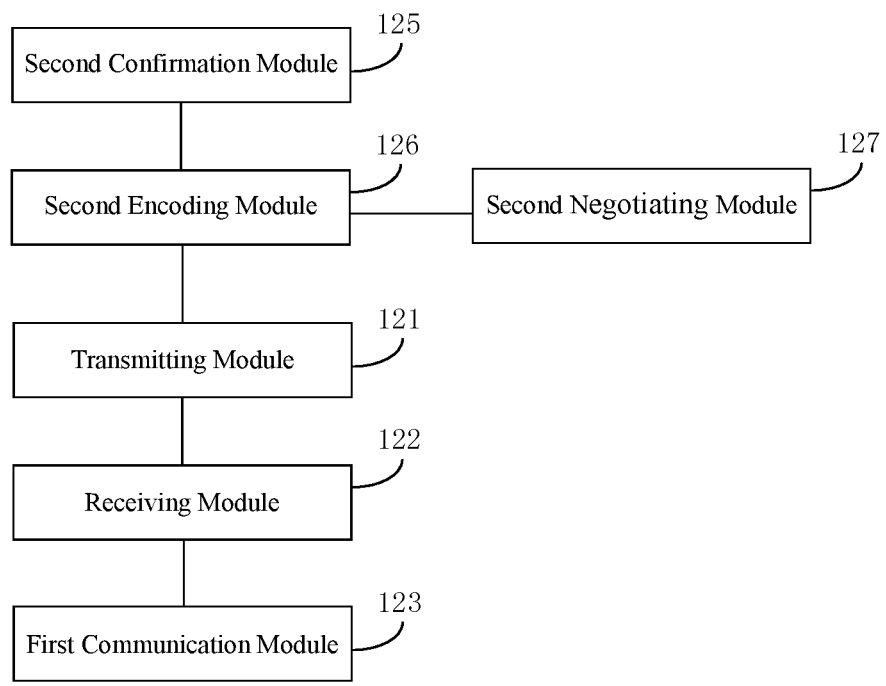
FIG. 15 is a block diagram showing another communication apparatus according to an exemplary embodiment.

FIG. 15 is a block diagram showing another communication apparatus according to an exemplary embodiment. As shown in FIG. 15, on the basis of the above-mentioned embodiment shown in FIG. 14, the apparatus may further includes a second negotiating module 127.

The second negotiating module 127 is configured to negotiate the preset encoding with the PRX before the second encoding module 126 encoding the out-of-band communication modes supported by the PTX and the first communication mode with the preset encoding mode.

In the above-mentioned embodiment, by negotiating the PRX on a preset encoding mode, conditions can be provided for subsequent identification of the communication mode supported by the peer side.

Figure 16:
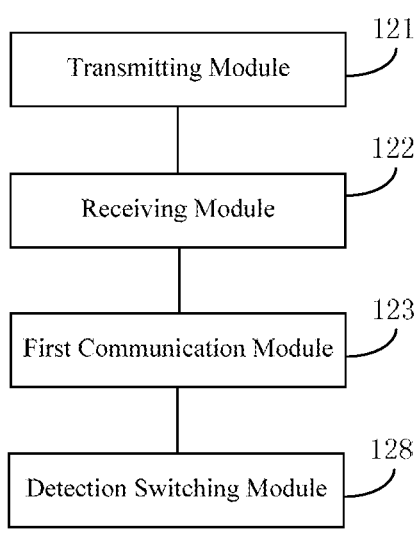
FIG. 16 is a block diagram showing another communication apparatus according to an exemplary embodiment.

FIG. 16 is a block diagram showing another communication apparatus according to an exemplary embodiment. As shown in FIG. 16, based on the embodiment shown in FIG. 12, the apparatus may further include a detection switching module 128.

The detection switching module 128 is configured to: after the first communication module 123 communicating with the PRX via the same out-of-band communication mode, if it is detected that duration of an interference signal exceeds a preset time period, switch to the first communication mode to communicate with the PRX.

In the above-mentioned embodiment, if it is detected that the duration of the interference signal exceeds the preset time period, the PTX switches to the first communication mode to communicate with the PRX, so as to ensure communication quality while supporting relatively high-rate communication.

Figure 17:
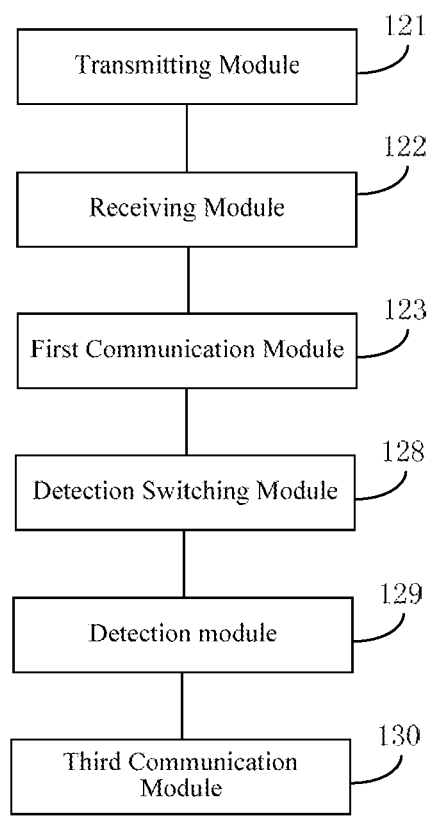
FIG. 17 is a block diagram showing another communication apparatus according to an exemplary embodiment.

FIG. 17 is a block diagram showing another communication apparatus according to an exemplary embodiment. As shown in FIG. 17, on the basis of the embodiment shown in FIG. 16, the apparatus may further include a detection module 129 and a third communication module 130.

The detection module 129 is configured to perform a detection of an interference signal for an out-of-band frequency band after the detection switching module 128 switching to the first communication mode to communicate with the PRX.

The third communication module 130 is configured to, in response to that signal strength of the interference signal detected by the detection module 129 drops to or below a preset threshold, communicate with the PRX via the same out-of-band communication mode currently determined when the same out-of-band communication mode exists between the out-of-band communication modes supported by the PTX and the out-of-band communication modes supported by the PRX.

In the above-mentioned embodiment, by performing the detection of the interference signal for the out-of-band frequency band, and in response to detecting that signal strength of the interference signal drops to or below the preset threshold, communicating with the PRX via the same out-of-band communication mode currently determined, when the same out-of-band communication mode exists between the out-of-band communication modes supported by the PTX and the out-of-band communication modes supported by the PRX, it is possible to improve the communication rate while ensuring the communication quality.

Figure 18:
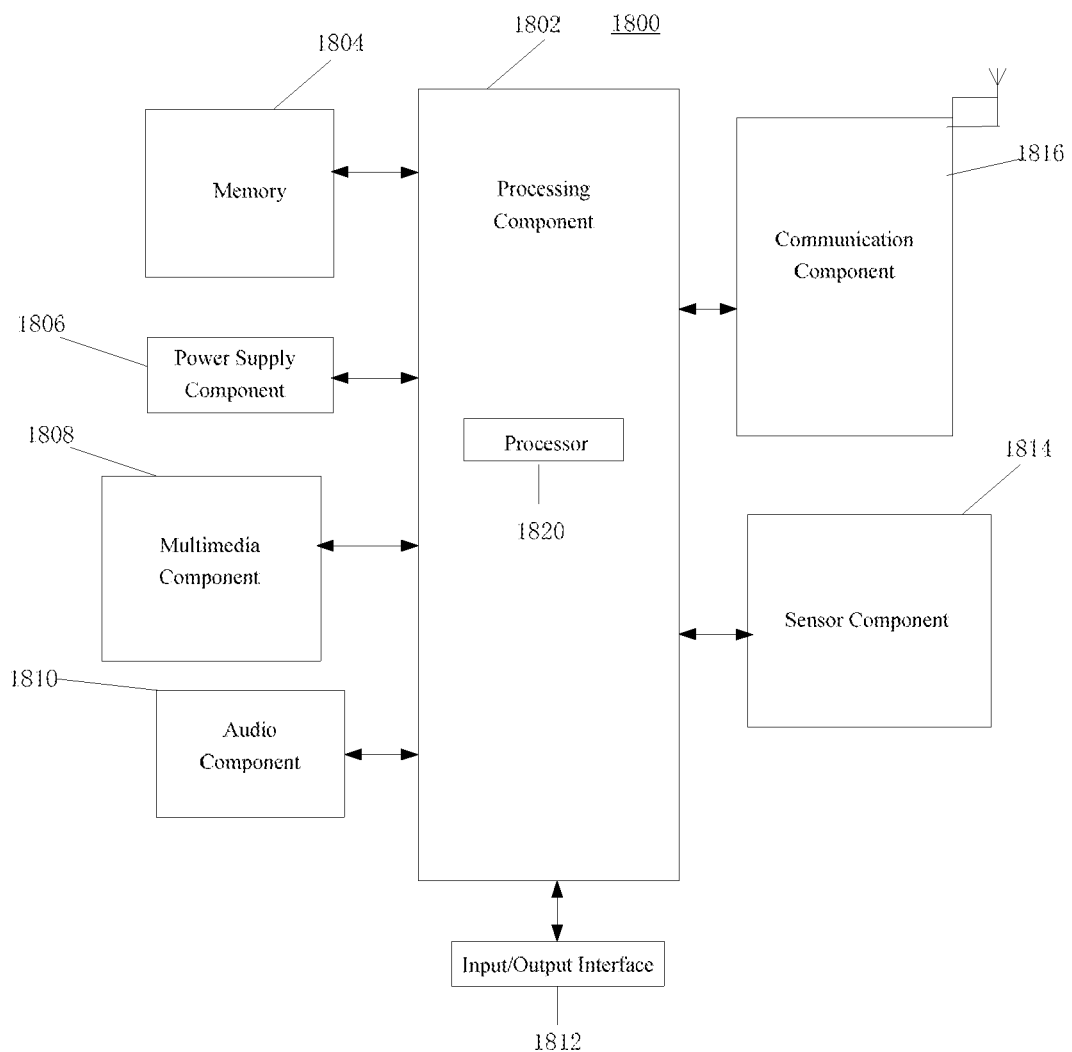
FIG. 18 is a block diagram suitable for a communication apparatus according to an exemplary embodiment.

FIG. 18 is a block diagram suitable for a communication apparatus according to an exemplary embodiment. The apparatus 1800 may be a mobile phone, a computer, a digital broadcasting terminal, a messaging device, a game console, a tablet device, a medical device, a fitness device, a personal digital assistant, or other power receiving apparatus or power transmitting apparatus.

Referring to FIG. 18, the apparatus 1800 includes one or more of the following components: a processing component 1802, memory 1804, a power supply component 1806, a multimedia component 1808, an audio component 1810, an input/output (I/O) interface 1812, a sensor component 1814, and a communication component 1816.

The processing component 1802 generally controls the overall operations of the apparatus 1900, such as operations associated with display, telephone calls, data communication, camera operations, and recording operations. The processing component 1802 may include one or more processors 1820 to execute instructions to complete all or part of the steps in the above method. In addition, the processing component 1802 may include one or more modules to facilitate interaction between the processing component 1802 and other components. For example, the processing component 1802 may include a multimedia module to facilitate interaction between the multimedia component 1808 and the processing component 1802.

When the communication apparatus is located in the power receiving device, one processor 1820 in the processing component 1802 may be configured to: receive one or more out-of-band communication modes supported by a power transmitter (PTX) transmitted via a first communication mode by the PTX, and the first communication mode comprising an enhanced in-band communication mode; match the out-of-band communication modes supported by the PTX and one or more out-of-band communication modes supported by the PRX; and return a data or a matching result that an out-of-band communication mode matches to the PTX via a same out-of-band communication mode, in response to the same out-of-band communication mode exists between the out-of-band communication modes supported by the PTX and the out-of-band communication modes supported by the PRX.

When the communication apparatus is located in the power transmission device, one processor 1820 in the processing component 1802 may be configured to: transmit one or more out-of-band communication modes supported by the PTX to a power receiver (PRX) via a first communication mode, wherein the first communication mode comprising an enhanced in-band communication mode; receive a data or a matching result of out-of-band communication returned by the PRX according to the out-of-band communication modes supported by the PTX; and communicate with the PRX via a same out-of-band communication mode, in response to confirming, according to the matching result, that the same out-of-band communication mode exists between the out-of-band communication modes supported by the PTX and the out-of-band communication modes supported by the PRX, or in response to the data being returned via the same out-of-band communication mode supported by both of the PTX and the PRX.

The memory 1804 is configured to store various types of data to support operations at the apparatus 1800. Examples of these data include instructions for any application or method operating on the apparatus 1800, contact data, phone book data, messages, pictures, videos, and so on. The memory 1804 may be implemented by any type of volatile or non-volatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power supply component 1806 provides power to various components of the apparatus 1800. The power supply component 1806 may include a power supply management system, one or more power supplies, and other components associated with generating, managing, and distributing power for the apparatus 1800.

The multimedia component 1808 includes a screen between the apparatus 1900 and the user that provides an output interface. In some embodiments, the screen may include a liquid crystal display (LCD) and a touch panel (TP). If the screen includes a touch panel, then the screen may be implemented as a touch screen to receive input signals from the user. The touch panel includes one or more touch sensors, to sense touching, swiping, and gestures on the touch panel. The touch sensor may not only sense the boundary of the touching action or swiping action, but also detect the duration and pressure related to the touching action or swiping operation. In some embodiments, the multimedia component 1808 includes a front camera and/or a rear camera. When the apparatus 1800 is in an operation mode, such as a shooting mode or a video mode, the front camera and/or the rear camera may receive external multimedia data. Each of the front camera and rear camera may be a fixed optical lens system or have focal length and optical zoom capabilities.

The audio component 1810 is configured to output and/or input audio signals. For example, the audio component 1810 includes a microphone (MIC). When the apparatus 1800 is in an operation mode, such as a call mode, a recording mode, and a voice recognition mode, the microphone is configured to receive an external audio signal. The received audio signal may be further stored in the memory 1804 or sent via the communication component 1816. In some embodiments, the audio component 1810 further includes a speaker for outputting audio signals.

The I/O interface 1812 provides an interface between the processing component 1802 and a peripheral interface module. The peripheral interface module may be a keyboard, a click wheel, a button and so on. These buttons may include, but are not limited to: home button, volume button, start button, and lock button.

The sensor assembly 1814 includes one or more sensors for providing the status assessment of various aspects for the apparatus 1800. For example, the sensor component 1814 can detect the on/off state of the apparatus 1800, and the relative positioning of the components, for example, the component is a display and a keypad of the apparatus 1800, and the sensor component 1814 can also detect the position change of the apparatus 1800 or a component of the apparatus 1800, the presence or absence of user contact with the apparatus 1800, the orientation or acceleration/deceleration of the apparatus 1800, and the temperature change of the apparatus 1800. The sensor assembly 1814 may include a proximity sensor configured to detect the presence of nearby objects without any physical contact. The sensor assembly 1814 may also include a light sensor, such as a CMOS or CCD image sensor, for use in imaging applications. In some embodiments, the sensor assembly 1914 may also include an acceleration sensor, a gyro sensor, a magnetic sensor, a pressure sensor, or a temperature sensor.

The communication component 1816 is configured to facilitate wired or wireless communication between the apparatus 1800 and other devices. The apparatus 1800 can access a wireless network based on a communication standard, such as WiFi, 2G, or 3G, or a combination thereof. In an exemplary embodiment, the communication component 1816 receives a broadcast signal or broadcast related information from an external broadcast management system via a broadcast channel. In an exemplary embodiment, the communication component 1816 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the apparatus 1800 may be implemented by one or more application specific integrated circuits (ASICs), digital signal processors (DSPs), digital signal processing devices (DSPDs), programmable logic devices (PLDs), Field programmable gate array (FPGA), controller, microcontroller, microprocessor or other electronic components, to execute the receiving method described in any of the above embodiments.

In an exemplary embodiment, there is also provided a non-transitory computer-readable storage medium including instructions, such as memory 1804 including instructions, which can be executed by the processor 1820 of the apparatus 1800 to complete the above method. For example, the non-transitory computer-readable storage medium may be ROM, random access memory (RAM), CD-ROM, magnetic tape, floppy disk, optical data storage device, or the like.

As for the apparatus embodiment, since it basically corresponds to the method embodiment, please refer to the part of the description of the method embodiment for related parts. The apparatus embodiments described above are merely illustrative, where the units described as separate components may or may not be physically separated, and the components displayed as units may or may not be physical units, that is, they may be located in one place, or they may be distributed to multiple network units. Some or all of the modules may be selected according to actual needs to achieve the objectives of the solutions of the embodiments. Those of ordinary skill in the art can understand and implement it without creative work.

It should be noted that in this context, relational terms such as first and second are only used to distinguish one entity or operation from another entity or operation, and do not necessarily require or imply that there is any such actual relationship or sequence between these entities or operations. The terms 'comprise', 'include', or any other variants thereof are intended to cover non-exclusive inclusion, so that a process, method, article or device including a series of elements includes not only those elements, but also other elements that are not explicitly listed, or also include elements inherent to such processes, methods, articles, or device. If there are no more restrictions, the element defined by the sentence 'including a . . . ' does not exclude the existence of other same elements in the process, method, article, or device that includes the element.

After considering the description and practice of the disclosure disclosed herein, those skilled in the art will easily think of other implementations of the disclosure. The present application is intended to cover any variations, usage, or adaptive changes of the present disclosure that follow the general principles of the present disclosure and include common general knowledge or customary technical means in the technical field not disclosed in the present disclosure. The description and examples are to be considered exemplary only, and the true scope and spirit of this disclosure are pointed out by the following claims.

It should be understood that the present disclosure is not limited to the precise structure that has been described above and shown in the drawings, and various modifications and changes can be made without departing from the scope thereof. The scope of the present disclosure is limited only by the appended claims.

What is claimed is:

1. A communication method, for applying to a power receiver (PRX), and the method comprising:
receiving one or more out-of-band communication modes supported by a power transmitter (PTX) transmitted via a first communication mode by the PTX, and the first communication mode comprising an enhanced in-band communication mode;
matching the out-of-band communication modes supported by the PTX and one or more out-of-band communication modes supported by the PRX;
returning a data or a matching result that an out-of-band communication mode matches to the PTX via a same out-of-band communication mode, in response to the same out-of-band communication mode existing between the out-of-band communication modes supported by the PTX and the out-of-band communication modes supported by the PRX;
returning the data or a matching result that an out-of-band communication mode does not match to the PTX via the first communication mode, in response to no same out-of-band communication mode existing between the out-of-band communication modes supported by the PTX and the out-of-band communication modes supported by the PRX;
after communicating with the PTX via the same out-of-band communication mode, in response to the PTX detecting that duration of an interference signal exceeds a preset time period, switching to the first communication mode to communicate with the PTX;
before receiving the out-of-band communication modes supported by the PTX transmitted via the first communication mode by the PTX, confirming that the PRX supports the first communication mode; and
encoding the out-of-band communication modes supported by the PRX and the first communication mode with a preset encoding mode.

2. The method according to claim 1, further comprising:
before encoding the out-of-band communication modes supported by the PRX and the first communication mode with the preset encoding mode, negotiating the preset coding mode with the PTX.

3. The method according to claim 1, further comprising:
after switching to the first communication mode to communicate with the PRX, performing a detection of an interference signal for an out-of-band frequency band;
in response to detecting that signal strength of the interference signal drops to or below a preset threshold, communicating with the PRX via the same out-of-band communication mode currently determined when the same out-of-band communication mode exists between the out-of-band communication modes supported by the PTX and the out-of-band communication modes supported by the PRX.

4. A non-transitory computer-readable storage medium having computer instructions stored thereon for execution by a processor to implement steps of the method according to claim 1.

5. A wireless charging and communication system implementing the method according to claim 1, comprising the PTX and the PRX.

6. The wireless charging and communication system according to claim 5, wherein the PTX is configured to communicate with the PRX via the same out-of-band communication mode, based on content returned by the PRX, such that the wireless communication system is compatible with multiple communication modes and supports improved communication rate in the wireless charging and communication system.

7. The wireless charging and communication system according to claim 6, wherein the PTX is further configured to:
transmit, via the first communication mode, the out-of-band communication modes supported by PTX to the PRX;
receive data or a matching result of out-of-band communication returned by the PRX according to the out-of-band communication modes supported by the PTX;
communicate with the PRX via the same out-of-band communication mode, when it is confirmed according to the matching result that the same out-of-band communication mode exists between the out-of-band communication modes supported by the PTX and the out-of-band communication modes supported by the PRX, or in response to the data being returned from the PRX via an out-of-band communication mode supported by the PTX;
communicate with the PRX via the first communication mode, in response to confirming, according to the matching result, that no same out-of-band communication mode exists between the out-of-band communication modes supported by the PTX and the out-of-band communication modes supported by the PRX, or in response to the data being returned via the first communication mode; and
after communicating with the PRX via the same out-of-band communication mode, upon it is detected that duration of an interference signal exceeds a preset time period, switch to the first communication mode to communicate with the PRX.

8. A communication method, for applying to a power transmitter (PTX), and the method comprising:
transmitting one or more out-of-band communication modes supported by the PTX to a power receiver (PRX) via a first communication mode, wherein the first communication mode comprising an enhanced in-band communication mode;
receiving a data or a matching result of out-of-band communication returned by the PRX according to the out-of-band communication modes supported by the PTX;
communicating with the PRX via the same out-of-band communication mode, in response to confirming, according to the matching result, that a same out-of-band communication mode exists between the out-of-band communication modes supported by the PTX and the out-of-band communication modes supported by the PRX, or in response to the data being returned from the PRX via an out-of-band communication mode supported by the PTX;

communicating with the PRX via the first communication mode, in response to confirming, according to the matching result, that no same out-of-band communication mode exists between the out-of-band communication modes supported by the PTX and the out-of-band communication modes supported by the PRX, or in response to the data being returned via the first communication mode;

after communicating with the PRX via the same out-of-band communication mode, upon it is detected that duration of an interference signal exceeds a preset time period, switching to the first communication mode to communicate with the PRX;

before transmitting the out-of-band communication modes supported by the PTX to the PRX via the first communication mode, confirming that the PTX supports the first communication mode; and encoding the first communication mode and one or more out-of-band communication modes supported by the PTX with a preset encoding mode.

9. The method according to claim 8, further comprising:

before encoding the out-of-band communication modes supported by the PTX and the first communication mode with the preset encoding mode, negotiating the preset coding mode with the PRX.

10. A power transmitting device, comprising:

a processor; and memory for storing instructions executable by the processor;

wherein the processor is configured to implement steps of the method according to claim 8.

11. A non-transitory computer-readable storage medium having computer instructions stored thereon for execution by a processor to implement steps of the method according to claim 8.

12. A power receiving device, comprising:

a processor; and memory for storing instructions executable by the processor;

wherein the processor is configured to:

receive one or more out-of-band communication modes supported by a power transmitter (PTX) transmitted by the PTX via a first communication mode, and the first communication mode comprising an enhanced in-band communication mode;

match the out-of-band communication modes supported by the PTX and one or more out-of-band communication modes supported by the PRX;

return a data or a matching result that an out-of-band communication mode matches to the PTX via a same out-of-band communication mode, in response to the same out-of-band communication mode existing between the out-of-band communication modes supported by the PTX and the out-of-band communication modes supported by the PRX;

return the data or a matching result that an out-of-band communication mode does not match to the PTX via the first communication mode, in response to no same out-of-band communication mode existing between the out-of-band communication modes supported by the PTX and the out-of-band communication modes supported by the PRX;

after communicating with the PTX via the same out-of-band communication mode, in response to the PTX detecting that duration of an interference signal exceeds a preset time period, switch to the first communication mode to communicate with the PTX;

confirm that the PRX supports the first communication mode, before receiving the out-of-band communication modes supported by the PTX transmitted via the first communication mode by the PTX; and encode the out-of-band communication modes supported by the PRX and the first communication mode with a preset encoding mode.

13. The power receiving device according to claim 12, wherein the processor is further configured to:

negotiate the preset coding mode with the PTX, before encoding the out-of-band communication modes supported by the PRX and the first communication mode with the preset encoding mode.

\* \* \* \* \*